United States Patent
Zhang et al.

(10) Patent No.: US 12,441,402 B2
(45) Date of Patent: Oct. 14, 2025

(54) VEHICLE SYSTEMS AND METHODS FOR ESTIMATING ROAD WHEEL ANGLES

(71) Applicant: GM GLOBAL TECHNOLOGY OPERATIONS LLC, Detroit, MI (US)

(72) Inventors: Yubiao Zhang, Sterling Heights, MI (US); Bo Yu, Novi, MI (US); Jarred James Versical, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 125 days.

(21) Appl. No.: 18/521,181

(22) Filed: Nov. 28, 2023

(65) Prior Publication Data

US 2025/0171080 A1    May 29, 2025

(51) Int. Cl.
*B62D 15/02*    (2006.01)

(52) U.S. Cl.
CPC ..... *B62D 15/023* (2013.01); *B60W 2520/105* (2013.01); *B60W 2520/125* (2013.01); *B60W 2520/18* (2013.01)

(58) Field of Classification Search
None
See application file for complete search history.

(56) References Cited

U.S. PATENT DOCUMENTS

| | | | | |
|---|---|---|---|---|
| 6,496,762 B2 * | 12/2002 | Kurishige | ............... | B62D 5/049 |
| | | | | 701/41 |
| 9,669,869 B2 * | 6/2017 | Kageyama | ............... | B62D 5/00 |
| 10,155,534 B2 * | 12/2018 | Varunjikar | ........... | B62D 5/0481 |
| 12,202,468 B2 * | 1/2025 | Isshiki | ................... | B60W 10/22 |
| 2002/0019690 A1 * | 2/2002 | Kurishige | ............. | B62D 6/008 |
| | | | | 180/443 |
| 2007/0273317 A1 * | 11/2007 | Endo | .................... | B62D 5/0466 |
| | | | | 318/432 |
| 2008/0119978 A1 * | 5/2008 | Stieff | ................. | G01B 11/2755 |
| | | | | 701/31.4 |

(Continued)

FOREIGN PATENT DOCUMENTS

| | | | | |
|---|---|---|---|---|
| CA | | 2819349 A1 * | 6/2012 | ............. B62D 5/001 |
| CA | | 2819349 C   * | 10/2016 | ............. B62D 5/001 |

(Continued)

OTHER PUBLICATIONS

German Office Action from counterpart DE1020241005653, dated Jan. 22, 2025.

*Primary Examiner* — Kevin R Steckbauer

(57) ABSTRACT

A vehicle system for determining a road wheel angle of a vehicle includes sensors configured to detect vehicle parameters including at least a steering rack load on a steering rack of the vehicle, and a control module in communication with the sensors. The control module is configured to calculate a kingpin torque based on the sensed steering rack load and a wheel-to-body displacement of the vehicle, determine a roll steer angle based on the wheel-to-body displacement of the vehicle, determine a road wheel angle of the vehicle based on the roll steer angle and the kingpin torque, and generate a signal indicative of the road wheel angle to control at least one vehicle control system. Other example vehicle systems and methods for determining a road wheel angle of a vehicle are also disclosed.

20 Claims, 7 Drawing Sheets

(56) References Cited

U.S. PATENT DOCUMENTS

| | | | | |
|---|---|---|---|---|
| 2008/0196966 | A1* | 8/2008 | Maruyama | B62D 17/00 |
| | | | | 180/446 |
| 2013/0245890 | A1* | 9/2013 | Kageyama | B62D 7/18 |
| | | | | 701/41 |
| 2014/0008141 | A1* | 1/2014 | Kageyama | B60G 3/20 |
| | | | | 180/400 |
| 2014/0145498 | A1* | 5/2014 | Yamakado | B60T 8/245 |
| | | | | 303/3 |
| 2015/0151778 | A1* | 6/2015 | Kageyama | B62D 5/006 |
| | | | | 701/41 |
| 2016/0114832 | A1* | 4/2016 | Taniguchi | B62D 6/04 |
| | | | | 701/41 |
| 2017/0355396 | A1* | 12/2017 | Varunjikar | B62D 6/002 |
| 2019/0351942 | A1* | 11/2019 | de Paula Eduardo | |
| | | | | B62D 15/021 |
| 2020/0114951 | A1* | 4/2020 | Kim | B62D 5/0463 |
| 2021/0061041 | A1* | 3/2021 | Tagami | B62D 6/04 |
| 2021/0240879 | A1* | 8/2021 | Vayssettes | G06F 30/20 |
| 2022/0297672 | A1* | 9/2022 | Isshiki | B60W 30/045 |

FOREIGN PATENT DOCUMENTS

| | | | | |
|---|---|---|---|---|
| CN | 100572165 | C * | 12/2009 | |
| CN | 114312199 | B * | 11/2023 | |
| DE | 60109840 | T2 * | 1/2006 | B62D 5/0466 |
| DE | 102017112952 | A1 * | 12/2017 | B62D 5/0463 |
| DE | 102019111388 | A1 * | 11/2019 | B62D 15/021 |
| DE | 102019111304 | A1 * | 4/2020 | B60W 10/20 |
| DE | 112018007781 | T5 * | 4/2021 | B60G 17/0195 |
| DE | 102017112952 | B4 * | 12/2022 | B62D 5/0463 |
| EP | 1127775 | A1 * | 8/2001 | B62D 5/0466 |
| EP | 1127775 | B1 * | 4/2005 | B62D 5/0466 |
| EP | 1995150 | A2 * | 11/2008 | B62D 5/0463 |
| EP | 2918479 | A1 * | 9/2015 | B60T 8/1755 |
| EP | 2875974 | B1 * | 8/2016 | B60G 3/20 |
| JP | 3547806 | B2 * | 7/2004 | |
| JP | 2004217069 | A * | 8/2004 | |
| JP | 2006088983 | A * | 4/2006 | |
| JP | 2006103632 | A * | 4/2006 | |
| JP | 2007269251 | A * | 10/2007 | |
| JP | 2009132181 | A * | 6/2009 | |
| JP | 4379290 | B2 * | 12/2009 | |
| JP | 4479443 | B2 * | 6/2010 | |
| JP | 2013043553 | A * | 3/2013 | |
| JP | 2013107615 | A * | 6/2013 | B60G 3/20 |
| JP | 2013224146 | A * | 10/2013 | B62D 5/001 |
| JP | 2014019368 | A * | 2/2014 | |
| JP | 5462373 | B2 * | 4/2014 | B60T 13/745 |
| JP | 6135278 | B2 * | 5/2017 | |
| JP | 6136136 | B2 * | 5/2017 | |
| JP | 6553256 | B1 * | 7/2019 | B60G 17/0195 |
| JP | 2023101221 | A * | 7/2023 | |
| KR | 1694764 | B1 * | 1/2017 | B62D 5/0409 |
| RU | 2824532 | C1 * | 8/2024 | |
| WO | WO-2012073469 | A1 * | 6/2012 | B62D 5/001 |
| WO | WO-2012124272 | A1 * | 9/2012 | B60G 3/20 |
| WO | WO-2014013682 | A1 * | 1/2014 | B60G 3/20 |
| WO | WO-2014073180 | A1 * | 5/2014 | B60T 8/1755 |
| WO | WO-2014208248 | A1 * | 12/2014 | B62D 15/025 |
| WO | WO-2019138501 | A * | 7/2019 | B62D 6/00 |

* cited by examiner

VEHICLE SYSTEMS AND METHODS FOR ESTIMATING ROAD WHEEL ANGLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems and methods for estimating road wheel angles.

Vehicles include control systems for controlling motion of the vehicles. Such control systems may include, for example, electric all-wheel drive control, torque vectoring control, active rear steering control, stability control, etc. In many cases, the control systems and/or state estimation algorithms in the vehicles rely on various inputs for control purposes. For example, the inputs may include a road wheel angle (RWA) input, which can be used for yaw rate estimation, slip angle estimation, under-steer angle estimation, etc.

SUMMARY

A vehicle system for determining a road wheel angle of a vehicle includes a plurality of sensors configured to detect a plurality of vehicle parameters including at least a steering rack load on a steering rack of the vehicle, and a control module in communication with the plurality of sensors. The control module is configured to calculate a kingpin torque based on the sensed steering rack load and a wheel-to-body displacement of the vehicle, determine a roll steer angle based on the wheel-to-body displacement of the vehicle, determine a road wheel angle of the vehicle based on the roll steer angle and the kingpin torque, and generate a signal indicative of the road wheel angle to control at least one vehicle control system.

In other features, the plurality of sensors includes at least one wheel-to-body sensor configured to detect the wheel-to-body displacement of the vehicle, and the control module is configured to receive the wheel-to-body displacement of the vehicle from the at least one wheel-to-body sensor.

In other features, the plurality of sensors includes at least one vertical acceleration sensor configured to detect a vertical acceleration of the vehicle, and the control module is configured to receive the vertical acceleration of the vehicle and determine the wheel-to-body displacement of the vehicle based on the vertical acceleration of the vehicle.

In other features, the plurality of sensors includes a body-based acceleration sensor configured to detect a longitudinal acceleration of the vehicle, and the control module is configured to receive the longitudinal acceleration of the vehicle and determine the wheel-to-body displacement of the vehicle based on the vertical acceleration of the vehicle and the longitudinal acceleration of the vehicle.

In other features, the plurality of vehicle parameters includes a steering wheel angle, and the control module is configured to determine a steering arm length of the vehicle based on the steering wheel angle and the wheel-to-body displacement of the vehicle, and calculate the kingpin torque based on the sensed steering rack load and the steering arm length.

In other features, the plurality of vehicle parameters includes a steering wheel angle, and the control module is configured to determine an estimated road wheel angle based on the steering wheel angle, and determine the road wheel angle of the vehicle based on the roll steer angle, the kingpin torque, and the estimated road wheel angle.

In other features, the control module is configured to convert the kingpin torque into a compliance steer angle, apply a low-pass filter to the compliance steer angle to generate a filtered compliance steer angle, and determine the road wheel angle of the vehicle based on the filtered compliance steer angle and the roll steer angle.

In other features, the control module is configured to determine wheel-to-body displacement values for a left side and a right side of the vehicle, convert the wheel-to-body displacement values into the roll steer angle, apply a filter to the roll steer angle to generate a filtered roll steer angle, and determine the road wheel angle of the vehicle based on the filtered roll steer angle and the filtered compliance steer angle.

In other features, the filter is a Kalman filter.

In other features, the control module is configured to determine an aligning torque of the vehicle based on the kingpin torque and a wheel torque, and determine the road wheel angle of the vehicle based on the roll steer angle, the kingpin torque, and the aligning torque.

In other features, the plurality of sensors includes a vehicle speed sensor configured to detect a speed of the vehicle, and the control module is configured to receive the speed of the vehicle and determine the aligning torque of the vehicle based on the kingpin torque, the wheel torque, and the speed of the vehicle.

In other features, the vehicle system further includes a vehicle control module in communication with the control module. The vehicle control module is configured to receive the road wheel angle signal from the control module, and control the at least one vehicle control system based on the road wheel angle signal.

In other features, a vehicle includes the vehicle system configured to determine the road wheel angle of the vehicle.

A method for determining a road wheel angle of a vehicle includes determining a kingpin torque based on a steering rack load and a wheel-to-body displacement of the vehicle, determining a roll steer angle based on the wheel-to-body displacement of the vehicle, determining a road wheel angle of the vehicle based on the roll steer angle and the kingpin torque, and generating a signal indicative of the road wheel angle to control at least one vehicle control system.

In other features, the method further includes determining the wheel-to-body displacement of the vehicle.

In other features, determining the wheel-to-body displacement of the vehicle includes sensing, via at least one wheel-to-body sensor, the wheel-to-body displacement of the vehicle or sensing, via at least one vertical acceleration sensor, a vertical acceleration of the vehicle, and determining the wheel-to-body displacement of the vehicle based on the vertical acceleration of the vehicle.

In other features, the method further includes sensing, via a body-based acceleration sensor, a longitudinal acceleration of the vehicle.

In other features, determining the wheel-to-body displacement of the vehicle includes determining the wheel-to-body displacement based on the vertical acceleration of the vehicle and the longitudinal acceleration of the vehicle.

In other features, the method further includes determining a steering arm length of the vehicle based on a steering wheel angle and the wheel-to-body displacement of the vehicle In other features, calculating the kingpin torque includes calculating the kingpin torque based on the steering rack load and the steering arm length.

In other features, the method further includes determining an estimated road wheel angle based on a steering wheel angle.

In other features, determining the road wheel angle of the vehicle includes determining the road wheel angle of the vehicle based on the roll steer angle, the kingpin torque, and the estimated road wheel angle.

In other features, the method further includes sensing, via a vehicle speed sensor, a speed of the vehicle, and determining an aligning torque of the vehicle based on the kingpin torque, a wheel torque, and the speed of the vehicle.

In other features, determining the road wheel angle includes determining the road wheel angle of the vehicle based on the roll steer angle, the kingpin torque, and the aligning torque.

In other features, the method further includes controlling the at least one vehicle control system based on the generated road wheel angle signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Control systems for vehicles rely on various inputs for controlling different aspects of the vehicles. In many cases, one of the key inputs used by the control systems and/or state estimation algorithms is a road wheel angle (RWA) input. RWA is often a critical input in vehicle motion control when estimating or determining a yaw rate, a slip angle, an under-steer angle, etc. As such, the accuracy of the RWA is an important factor for vehicle control.

RWA (or sometimes referred to a road steering angle) refers to the angle of wheels of the vehicle relative to a longitudinal (or X) axis of the vehicle. For instance, when a wheel is not turned, a longitudinal axis of a wheel, which extends radially along a diameter of the wheel and parallel to a road surface, is at 0°. When not turned, the longitudinal axis of the wheel extends parallel to a longitudinal (or X) axis of the vehicle. When the wheel is turned to the right, the longitudinal axis of the wheel is at a positive (or negative) angle relative to the longitudinal axis of the vehicle. When the wheel is turned to the left, the longitudinal axis of the wheel is at a negative (or positive) angle relative to the longitudinal axis of the vehicle.

Conventionally, the RWA is estimated by assuming a simple kinematic ratio relationship between a steering wheel angle and the RWA. For example, a fixed ratio of 1/10 may be employed for all conditions. In such examples, if a sensed steering wheel angle is ten degrees (e.g., a driver rotates the steering wheel ten degrees), then the estimated RWA is one. In other examples, the kinematic ratio can be a linear or a nonlinear function of the steering wheel angle. However, the conventional method of estimating the RWA often leads to significant discrepancies between the estimated kinematic RWA and the actual RWA during dynamic maneuvers.

The vehicle systems and methods according to the present disclosure utilize various factors that affect RWA in addition to a steering wheel angle to generate an accurate and reliable RWA estimation for control systems in vehicles. For example, as compared with conventional methods of RWA estimation, the vehicle systems and methods herein utilize steering rack force and wheel-body displacement signals to compensate for compliance steer (e.g., due to a kingpin torque) generated by a suspension system and roll steer (e.g., due to vehicle roll motion) in a vehicle. Such solutions based on multiple factors provide for more precise and reliable RWA estimation for control systems in vehicles as compared to conventional methods.

Figure 1:
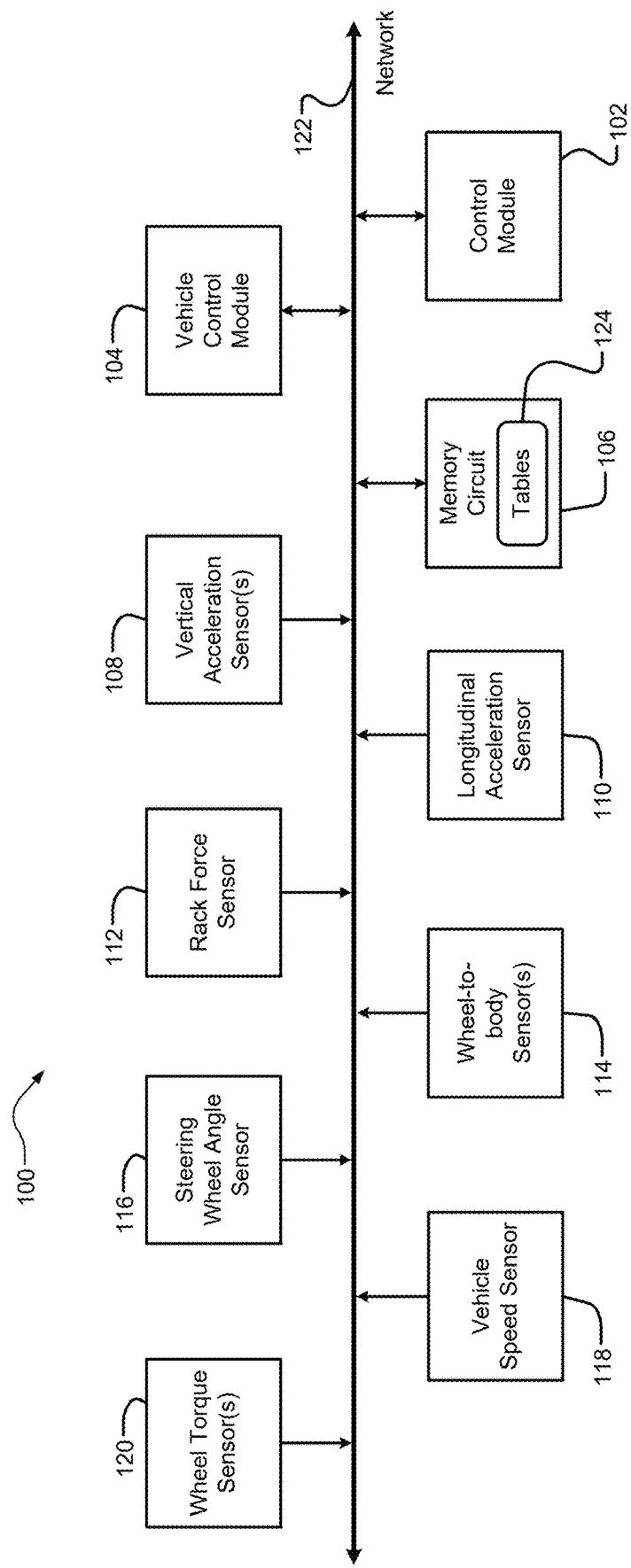
FIG. 1 is a functional block diagram of an example vehicle system for determining a RWA of a vehicle, according to the present disclosure.

Referring now to FIG. 1, a block diagram of an example vehicle system 100 is presented for estimating or otherwise determining a RWA of a vehicle. As shown in FIG. 1, the vehicle system 100 generally includes a control module 102, a vehicle control module 104, a memory circuit 106 storing one or more look-up tables 124, and various sensors for detecting or sensing vehicle parameters. In the example of FIG. 1, the sensors may include one or more vertical acceleration sensors 108, a longitudinal acceleration sensor 110, a rack force sensor 112, one or more wheel-to-body sensors 114, a steering wheel angle sensor 116, a vehicle speed sensor 118, and one or more wheel torque sensors 120.

Although FIG. 1 illustrates the vehicle system 100 as including specific modules, it should be appreciated that one or more other modules may be employed if desired. Additionally, while the vehicle system 100 is shown as including multiple separate modules, any combination of the modules (e.g., the control module 102, the vehicle control module 104, etc.) and/or the functionality thereof may be integrated into one or more modules. Further, although the vehicle system 100 of FIG. 1 is shown as including particular sensors, it should be appreciated that the system 100 and/or other systems may include more or less sensors, sensors having different functionalities, etc.

In various embodiments, the modules and sensors of the vehicle system 100 may be in communication with each other and may share parameters via a network 122, such as a controller area network (CAN). In such examples, the parameters may be shared via one or more data buses of the network 122. As such, various parameters may be made available by a given module and/or sensor to other modules and/or sensors via the network 122.

The vehicle system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the vehicle system 100 may be applicable to an autonomous vehicle, a semi-autonomous vehicle, etc. For example, FIG.

2 depicts a vehicle 200 including the control module 102 and the vehicle control module 104 of FIG. 1, and sensors 250 (e.g., the vertical acceleration sensor(s) 108, the longitudinal acceleration sensor 110, the rack force sensor 112, the wheel-to-body sensor(s) 114, the steering wheel angle sensor 116, the vehicle speed sensor 118, the wheel torque sensor(s) 120, etc.) in communication with the control module 102 and/or the vehicle control module 104.

With continued reference to FIG. 1, the acceleration sensors 108, 110 may be accelerometers and/or other suitable sensors for generally detecting acceleration components associated with the vehicle. For example, the longitudinal acceleration sensor 110 (e.g., a body-based acceleration sensor) may be optionally employed in the vehicle system 100 for detecting a longitudinal acceleration of the vehicle. In other words, the sensor 110 detects a change in velocity in the longitudinal axis (e.g., the length) of the vehicle. The vertical acceleration sensor(s) 108 may be optionally employed in the vehicle system 100 for detecting vertical acceleration of the vehicle near one or more corners of the vehicle. For instance, the vehicle system 100 may include one of the acceleration sensors 108 located near each wheel of the vehicle. In such examples, each acceleration sensor 108 detects a change in velocity in the vertical axis (e.g., the height) of the vehicle at its adjacent wheel.

The rack force sensor 112 of FIG. 1 generally measures force on a shaft, screw, and/or gear of a steering rack in the vehicle. For example, the rack force sensor 112 may detect the force (e.g., a steering rack load) transmitted from front or rear tires to the steering rack of the vehicle through tie rods. In such examples, the transmitted force arises from the interaction of the tires with the ground (e.g., the road, etc.). In other examples, the rack force can be estimated based on steering system signals (e.g., a steering motor torque, a motor position, and motor velocity) and vehicle signals (e.g., a vehicle yaw rate and a vehicle speed).

The sensors 114, 116, 118, 120 generally detect additional parameters associated with the vehicle. For example, the wheel-body sensor(s) 114 may be optionally employed in the vehicle system 100 for measuring a relative linear displacement between the vehicle's wheels and body (or frame). Additionally, the wheel torque sensor(s) 120 may be optionally employed in the vehicle system 100 for measuring torque at the wheel of the vehicle. For example, each wheel torque sensor 120 may measure torque (or a moment) about any suitable axis (e.g., the y-axis, etc.) of one of the wheels. In some examples, the vehicle system 100 may include one of the wheel-body sensors 114 and one of the wheel torque sensors 120 located near each wheel of the vehicle. In other examples, the wheel torque can be estimated based on a motor or engine torque and other signals. Further, the vehicle speed sensor 118 of FIG. 1 generally measures a speed or velocity in the longitudinal axis of the vehicle, and the steering wheel angle sensor 116 generally monitors a rotational position, movement, etc. of the vehicle's steering wheel to generate a steering wheel angle.

In various embodiments, the vehicle system 100 of FIG. 1 may be applicable for estimating or otherwise determining a RWA of the vehicle. This determination may be based on various vehicle parameters, as further explained herein. For example, when making the RWA determination, the control module 102 may take into account suspension and steering conditions. In various examples, these conditions may be utilized by the control module 102 in addition to conventional techniques relying on the steering wheel angle to generate an accurate and reliable RWA estimation for control systems in the vehicle. Further, and as further explained, the control module 102 may optionally account for tire parameters when determining the RWA.

For example, with respect to suspension effects, the control module 102 may rely on a kingpin torque when making the RWA determination. For instance, the control module 102 may calculate the kingpin torque for the vehicle based on a steering rack load and a wheel-to-body displacement of the vehicle. In such examples, the control module 102 may receive a signal from the rack force sensor 112 indicative of the steering rack load.

In such examples, the wheel-to-body displacement may be obtained in various manners, any of which may be suitable for use in making the RWA determination. For example, if wheel-to-body sensors (e.g., the wheel-to-body sensor(s) 114 of FIG. 1) are present, the control module 102 may receive one or more signals indicative of a wheel-to-body displacement from one or more of the wheel-to-body sensor(s) 114. In other examples, the vehicle may not include wheel-to-body sensors. In such examples, the control module 102 may determine the wheel-to-body displacement of the vehicle based on the vertical acceleration of the vehicle.

For example, the control module 102 may receive one or more signals from the acceleration sensors 108 located near each wheel of the vehicle. In such examples, each signal may be indicative of a vertical acceleration component at one of the wheels of the vehicle. Then, the control module 102 may determine the wheel-to-body displacement based on the vertical acceleration data. For example, the control module 102 may integrate the acceleration data twice to transform the acceleration data to a velocity component and then to a distance component (e.g., the wheel-to-body displacement). In various embodiments, the control module 102 may receive the vertical acceleration data after calibrating an initial ride height position of the vehicle. In some examples, the control module 102 may also reset to this position during steady state to clear any error.

In various embodiments, undesirable noise may be generated when the control module 102 transforms the vertical acceleration data into the wheel-to-body displacement due to the integration. In such examples, the control module 102 may apply one or more filters, such as a high pass filter, a low pass, a bandpass, etc. to eliminate high and low frequency noise (e.g., high frequency road texture and low frequency sensor drift) from the accelerometer signals.

In some examples, the wheel-to-body displacement may be determined without sensor data. For example, when the vehicle is experiencing significant wheel-to-body displacement, undesirable noise may be generated by the vertical acceleration sensor(s) 108. As such, during periods where the vertical acceleration sensor(s) 108 are dynamically changing, the control module 102 may perform integration based on suspension parameters and system effective inertia to estimate the wheel-to-body relative position without data (e.g., without continuous data) from the sensors. In such examples, the control module 102 may generally predict movement near the wheels based on initial states of the acceleration sensor(s) 108 and predictive models of the acceleration sensor(s) 108.

Additionally, the control module 102 may optionally rely on a body-based acceleration of the vehicle to obtain a more accurate wheel-to-body displacement. For example, the control module 102 may receive a signal indicative of the vehicle's longitudinal acceleration from the longitudinal acceleration sensor 110, and then determine the wheel-tobody displacement of the vehicle based on the vertical acceleration of the vehicle and the longitudinal acceleration of the vehicle.

In various embodiments, the kingpin torque may be determined based in part on the steering wheel angle. For example, the control module 102 may receive a signal indicative of the steering wheel angle from the steering wheel angle sensor 116, and then determine a steering arm length of the vehicle based on the received steering wheel angle and the wheel-to-body displacement of the vehicle. In such examples, the steering arm length may represent the shortest distance between the vehicle's suspension steer axis and vehicle's steering rack attachment to the wheel carrier. In some examples, the control module 102 may use a look-up table (e.g., one of the look-up tables 124 stored in the memory circuit 106) to determine the steering arm length value according to the corresponding steering wheel angle and wheel-to-body displacement values in the table. In other examples, the control module 102 may apply a function to determine the steering arm length according to the steering wheel angle and wheel-to-body displacement values. Then, once the steering arm length is obtained, the control module 102 can calculate the kingpin torque by multiplying the sensed steering rack load and the steering arm length.

Additionally, and as referenced above, the control module 102 may rely on steering conditions when making the RWA determination. For example, with respect to steering effects, the control module 102 may rely on a roll steer angle of the vehicle when making the RWA determination. The roll steer angle may represent the steering angle of steered wheels during the rolling action of the vehicle body due to, for example, cornering maneuvers, bumps, etc. For instance, the control module 102 may calculate or otherwise determine a roll steer angle based on the wheel-to-body displacement of the vehicle. For example, the control module 102 may obtain the wheel-body displacement as explained herein. Then, the control module 102 may use a look-up table (e.g., one of the look-up tables 124 stored in the memory circuit 106) to convert the wheel-body displacement values into the roll steer angle value. In other examples, the control module 102 may apply a function to determine the roll steer angle according to the wheel-body displacement values.

Then, the control module 102 may determine the RWA of the vehicle based on the roll steer angle and the kingpin torque. For example, in FIG. 1, the control module 102 converts the kingpin torque into a compliance steer angle, which generally represents the amount of self-steer generated by the vehicle's suspension system when it is subject to a cornering (e.g., a lateral) load. In such examples, the control module 102 may use a look-up table (e.g., one of the look-up tables 124 stored in the memory circuit 106) or apply a function to determine the compliance steer angle based on the kingpin torque value. The control module 102 can then combine the compliance steer angle and the roll steer angle to estimate the RWA of the vehicle. In various embodiments, the control module 102 may apply a function, weighted values, etc. to estimate the RWA of the vehicle based on the compliance steer angle and the roll steer angle.

Additionally, in some embodiments, one or more filters are applied to the compliance steer angle and the roll steer angle before using such parameters to estimate the RWA of the vehicle. For example, the control module 102 may apply filters to the compliance steer angle and the roll steer angle to generate a filtered steer angle and a filtered roll steer angle. Then, the control module 102 may determine the RWA of the vehicle based on the filtered compliance steer angle and the filtered roll steer angle.

In the example of FIG. 1, the filter applied to the roll steer angle may be any suitable filter. For example, the filter may be a conventional Kalman filter to remove displacement sensor noise or another suitable type of filter. In such examples, the Kalman filter may receive inputs, such as a covariance of process noise and a covariance of measurement noise. The covariance of process noise may depend on, for example, the vehicle design (e.g., one vehicle may have less process noise than another vehicle due to, for example, different centers of gravity, different masses, different suspensions, etc.) and active roll control and damper technologies. The covariance of measurement noise may depend on, for example, displacement sensor noise levels.

In various embodiments, the filter applied to the compliance steer angle may be a low-pass filter specifically designed to capture the response from the kingpin torque to the RWA and obtain the kingpin torque to RWA relationship. For example, the low-pass filter may have a first order filter structure (e.g., the simpler form of the filter) or a second order filter structure (e.g., the more complex form of the filter).

The low-pass filter may be designed in any suitable manner. For example, the control module 102 and/or another module in the system 100 or external to the system 100 may obtain frequency sweep data from one or more vehicle tests or simulations. Such data may include, for example, a steering wheel angle (e.g., 30 degrees, etc.), a frequency sweep range (e.g., 0-5 Hz sweep), a recorded filtered roll steer angle, a compliance steer angle, a front (or rear) RWA, etc. Then, a specific low-pass filter structure (e.g., a first order filter structure, a second order filter structure, etc.) is selected, and a Bode plot is obtained using a function (e.g., MATLAB tfestimate, etc.). Next, the selected low-pass filter structure may be optimized to obtain the low-pass filter parameters. For example, the low-pass filter structure may be optimized according to equation (1) below, subject to model parameter ranges (e.g., all parameters are positive). In equation (1), h1 and h2 are starting and ending frequencies of the integral, W(h) is a weighting function (and a function of the frequency h), Data(h) is the magnitude/phase response (in dB) of the Bode plot from experimental data, and ModelFit(h) is the magnitude/phase response (in dB) of the selected low-pass filter structure with to be determined parameter values (e.g., $\tau$, z, $\zeta$, $\omega_n$).

$$\min_{\tau,z,\zeta,\omega_n} \int_{h_1}^{h_2} W(h) \times \|\text{Data}(h) - \text{ModelFit}(h)\| dh \qquad \text{Equation (1)}$$

In various embodiments, the control module 102 may optionally utilize conventional techniques relying on the steering wheel angle when making the RWA determination. For example, and as explained above, the control module 102 may receive a signal indicative of the steering wheel angle. Then, the control module 102 may determine an estimated RWA based on the steering wheel angle according to conventional techniques. For instance, the control module 102 may determine the estimated RWA by applying a kinematic ratio relationship between the steering wheel angle and the RWA, as explained herein. Then, the control module 102 may determine the RWA of the vehicle based on the roll steer angle, the compliance steer angle (e.g., based on the kingpin torque), and the estimated RWA. In such examples, the control module 102 may apply a function, weighted values, etc. to determine the RWA of the vehicle, as explained herein.

With continued reference to FIG. 1, the control module 102 may optionally utilize tire parameters when determining the RWA as referenced above. For instance, the control module 102 can calculate tire parameters, such as tire tractive forces, lateral forces, and aligning torques as further explained herein, and then use such parameters when determining the RWA.

For example, the control module 102 may determine one or more tire parameters based on a wheel torque associated with one or more of the wheels of the vehicle. For instance, the control module 102 may determine an aligning torque of the vehicle based on the kingpin torque and the wheel torque. In some examples, the aligning torque may be determined based on a speed of the vehicle (e.g., as received by the vehicle speed sensor 118) in addition to the wheel torque and the kingpin torque. Additionally, the control module 102 may determine a tractive force for one or more of the tires of the vehicle. In such examples, the tractive force may be calculated based on, for example, the wheel torque of the tire/wheel (e.g., a moment My representing the moment about the y-axis of the wheel) and a radius of the tire. In such examples, the wheel torque may be obtained from the wheel torque sensor 120 associated with one of the wheels of the vehicle. In other examples, the wheel torque may be estimated through conventional methods, such as based a known engine torque, a gear ratio, and a drive ratio.

Additionally, the control module 102 may determine other tire parameters based on the aligning torque for use in determining the RWA of the vehicle. For instance, in some examples, the control module 102 may determine a lateral tire force and a tire aligning torque based on the aligning torque. In such examples, the lateral tire force and the tire aligning torque may be determined based on a pneumatic trail and/or a mechanical trail of the tire in addition to the aligning torque.

Then, the control module 102 may determine the RWA of the vehicle based in part on the aligning torque, the tractive force, the lateral tire force and/or the tire aligning torque. In such examples, the control module 102 can convert such torque/force values into angular values, and then determine the RWA of the vehicle based in part on the angular values. In various embodiments, the angular values may be obtained with one or more look-up tables (e.g., one or more of the look-up tables 124 stored in the memory circuit 106) or with implemented functions.

With continued reference to FIG. 1, the control module 102 may determine the RWA according to the vehicle parameters references above. For example, the control module 102 may determine the RWA by combining two or more of the suspension parameters, the steering parameters, the tire parameters, the estimated RWA, etc. according to a desired function. In such examples, the function may be a second order transfer function or another suitable function to compensate for dynamic delays.

Then, the control module 102 generates and transmits one or more signals indicative of the determined RWA to the vehicle control module 104. Once received, the vehicle control module 104 can control at least one vehicle control system based on the RWA signal. For example, the vehicle control module 104 may be used to control vehicle control systems, such as an electric all-wheel drive control, a torque vectoring control, an active rear steering control, a stability control, etc. based on the RWA. Additionally, in various embodiments, the vehicle control module 104 may use the RWA as an input for determining a yaw rate, a slip angle, an under-steer angle, etc. for vehicle control purposes.

Figure 3:
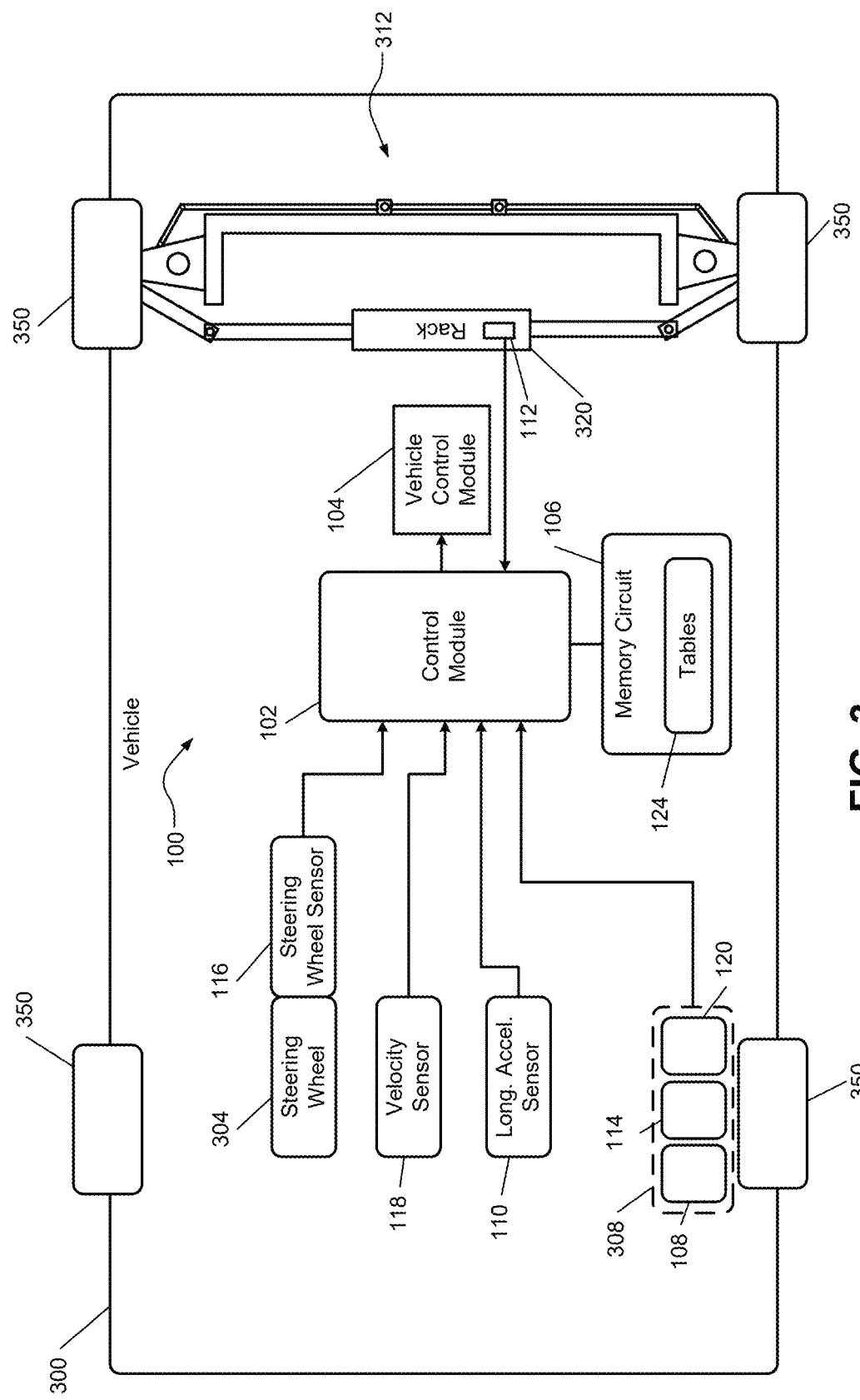
FIG. 3 is a functional block diagram of a vehicle including the vehicle system of FIG. 1, according to the present disclosure.

FIG. 3 depicts a vehicle 300 including the system 100 of FIG. 1. As shown, the system 100 includes the control module 102, the vehicle control module 104, the vertical acceleration sensor(s) 108, the longitudinal acceleration sensor 110, the rack force sensor 112, the wheel-to-body sensor(s) 114, the steering wheel angle sensor 116, the vehicle speed sensor 118, and the wheel torque sensor(s) 120, and the memory circuit 106 (with the table(s) 124 stored therein) of FIG. 1. Additionally, the system 100 of FIG. 3 includes a steering wheel 304, four wheels 350, and a suspension system 312. While the vertical acceleration sensor 108, the wheel-to-body sensor 114, and the wheel torque sensor 120 are shown in FIG. 3 as being located at one of the wheels 350, it should be appreciated that the vertical acceleration sensor 108, the wheel-to-body sensor 114, and the wheel torque sensor 120 may form a collection of sensors 308 that may be located at each of the wheels 350.

As shown in FIG. 3, the suspension system 312 includes a steering rack 320 with the rack force sensor 112. In such examples, a position of the steering rack 320 may be controlled by a control module (e.g., the control module 102, the vehicle control module 104, etc.) in a conventional manner. In the example of FIG. 3, the suspension system 312 is a front suspension system. In other examples, the suspension system 312 may be a rear suspension system.

Figure 2:
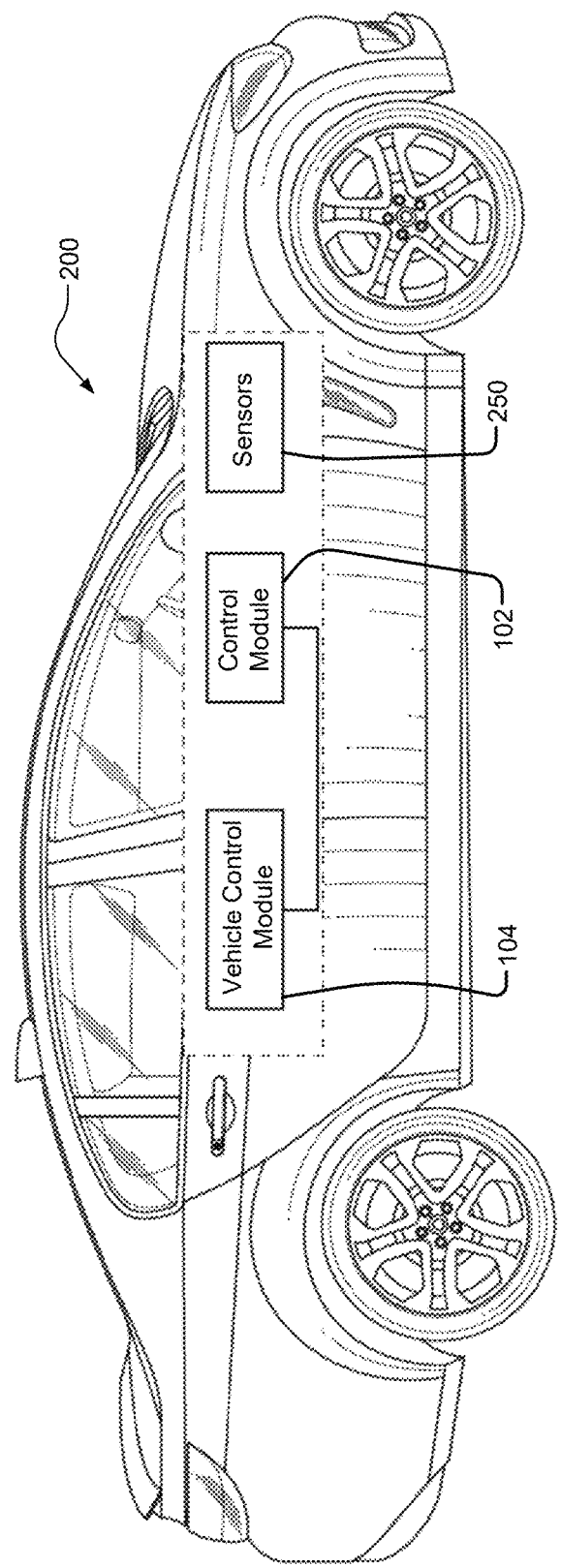
FIG. 2 is a vehicle including portions of the vehicle system of FIG. 1, according to the present disclosure.

FIGS. 4-7 illustrate example control processes 400, 500, 600, 700 employable by the vehicle system 100 of FIG. 1 for estimating or otherwise determining a RWA of a vehicle (e.g., the vehicle 200 of FIG. 2, the vehicle 300 of FIG. 3, etc.). Although the example control processes 400, 500, 600, 700 are described in relation to the vehicle system 100 of FIG. 1 including the control module 102, any one of the control processes 400, 500, 600, 700 may be employable by another suitable system.

Figure 4:
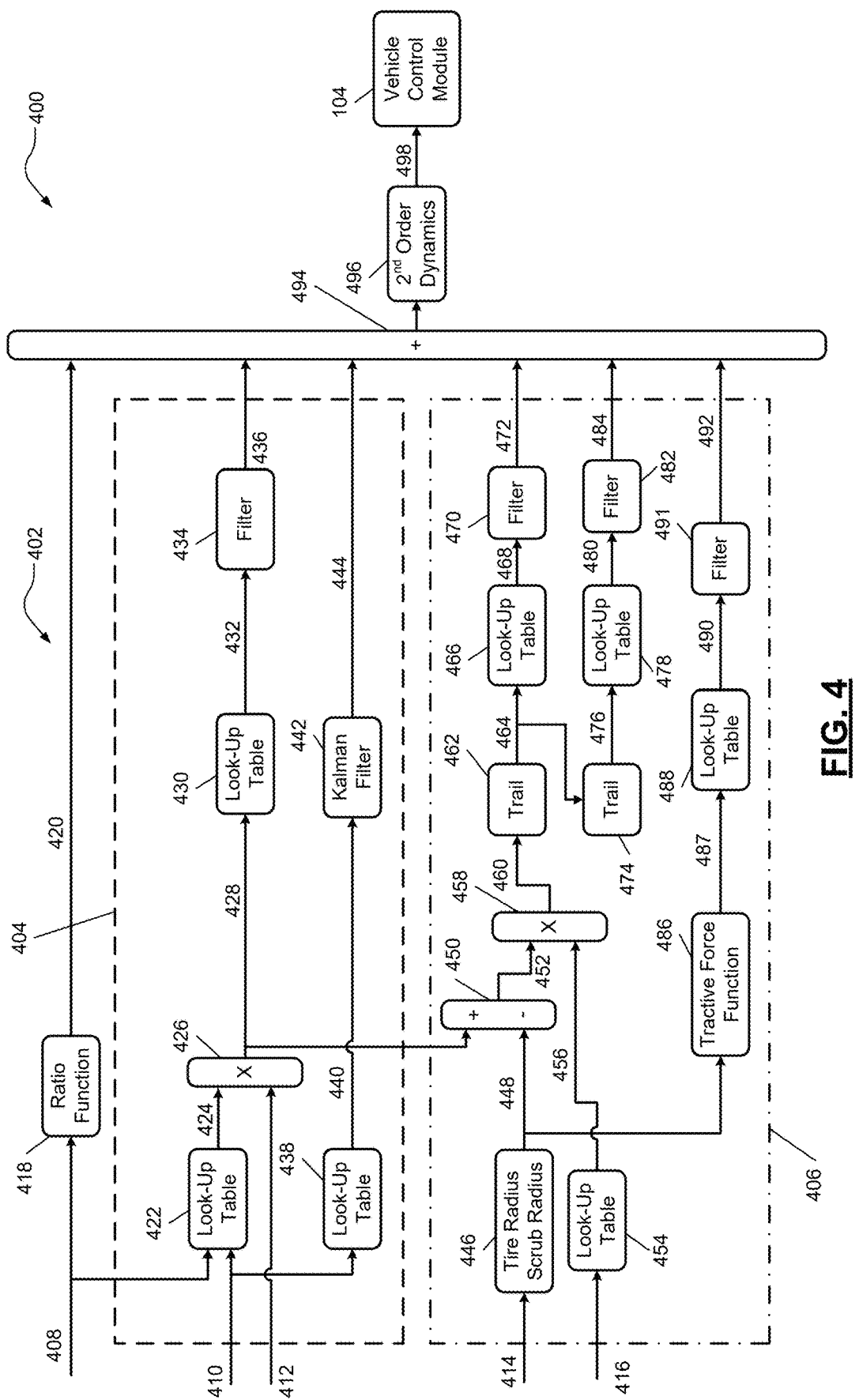
FIGS. 4-7 are flowcharts of example control processes for determining a RWA of a vehicle, according to the present disclosure.

In FIG. 4, the control process 400 begins by receiving various inputs. For example, a steering wheel angle 408, a wheel-body displacement 410, a steering rack force or load 412, a wheel torque 414, and a vehicle speed 416 are received by the control module 102. In such examples, the steering wheel angle 408, the steering rack load 412, the wheel torque 414, and the vehicle speed 416 may be provided by the steering wheel angle sensor 116, the rack force sensor 112, the wheel torque sensor 120, and the vehicle speed sensor 118, respectively, as explained herein. Additionally, the wheel-body displacement 410 may be provided by the wheel-to-body sensor 114 if available or determined based on the vertical acceleration of the vehicle (e.g., provided by the vertical acceleration sensor 108), as explained herein.

The control process 400 then determines the RWA of the vehicle by taking into account different vehicle parameters, such as suspension parameters, steering parameters, tire parameters, etc. In such examples, the control process 400 includes a control path 404 represented by a dashed box for determining the suspension and steering parameters, and an optional control path 406 represented by a dash-dot-dash box for determining the tire parameters. Additionally, when determining the RWA of the vehicle, the control process 400 may include another control path 402 to account for conventional techniques used to estimate RWA.

In the control path 402, the control module 102 estimates the RWA according to conventional techniques. For example, and as explained above, the control module 102 may determine an estimated RWA 420 by applying a kinematic ratio relationship 418 between the received steering wheel angle 408 and the RWA.

In the control path 404, a compliance steer angle and a roll steer angle are calculated for use in determining the RWA of the vehicle. For example, the control module 102 obtains a steering arm length 424 from a look-up table 422 according to the received steering wheel angle 408 and wheel-body displacement 410. Then, the control module 102 multiples (at box 426) the steering arm length 424 by the steering rack load 412 to obtain a kingpin torque 428. The control module 102 then obtains a compliance steer angle 432 according to a look-up table 430 (or according to a desired function) based on the kingpin torque 428, as shown. Next, the control module 102 applies a filter 434 to the compliance steer angle 432 to obtain a filtered compliance steer angle 436. In such examples, the filter 434 may be a low-pass filter specifically designed to capture the kingpin torque 428 to RWA relationship, as explained herein.

To determine the roll steer angle, the control module 102 may implement a look-up table or a desired function. Specifically, in the example of FIG. 4 the control module 102 obtains a roll steer angle 440 according to a look-up table 438 based on the received wheel-body displacement 410. Then, the control module 102 applies a filter 442 to the roll steer angle 440 to obtain a filtered roll steer angle 444. In such examples, the filter 442 may be a conventional Kalman filter or another suitable filter, as explained herein.

In the optional control path 406, a lateral tire force, a tire aligning torque, and a tractive force (e.g., annular representations thereof) are calculated for use in determining the RWA of the vehicle. For example, the control module 102 determines an induced tractive force 448 based on the wheel torque 414 (e.g., a moment My representing the moment about the y-axis of the wheel), a tire radius, and a scrub radius. In such examples, the tire radius and the scrub radius may be stored in memory (represented by a box 446), such as the memory circuit 106 of FIG. 1. Then, the control module 102 compares the kingpin torque 428 and the induced tractive force 448 at box 450 and generates an output 452. Additionally, the control module 102 obtains an aligning torque percentage 456 according to a look-up table 454 (or according to a desired function) based on the received vehicle speed 416. The control module 102 then multiples (at box 458) the aligning torque percentage 456 and the output 452 to obtain an aligning torque 460.

Next, the control module 102 calculates a lateral tire force 464 based on the aligning torque 460 and a mechanical and pneumatic trail (represented by box 462), converts the lateral tire force 464 into a lateral tire angle 468, and applies one or more filters 470 to obtain a filtered lateral tire angle 472. Additionally, the control module 102 calculates a tire aligning torque 476. In such examples, the tire aligning torque 476 is determined based on the lateral tire force 464 and a pneumatic trail (represented by box 474). Then, the control module 102 converts the tire aligning torque 476 into a tire aligning angle 480 and applies one or more filters 482 to obtain a filtered tire aligning angle 484. In such examples, the conversion to the angular values may be accomplished via look-up tables 466, 478 or desired functions.

Further, the control module 102 calculates a tractive force 487 according to a tractive force function (represented by box 486). In such examples, the tractive force 487 may be calculated based on the received wheel torque 414 and the tire radius. Then, the control module 102 converts the tractive force 487 into a tractive angle 490 and applies one or more filters 491 to obtain a filtered tractive angle 492. In such examples, the conversion to the angular value may be accomplished via a look-up table 488 or a desired function.

Then, the control module 102 determines the RWA for the vehicle based on the estimated RWA 420, the filtered compliance steer angle 436, and the filtered roll steer angle 444. In some optional embodiments, the control module 102 may also take into account the filtered lateral tire angle 472, the filtered tire aligning angle 484, and the filtered tractive angle 492 if desired. For example, the control module 102 may combine (represented by box 494) the estimated RWA 420, the filtered compliance steer angle 436, the filtered roll steer angle 444, the filtered lateral tire angle 472, the filtered tire aligning angle 484, and the filtered tractive angle 492 and then determine the RWA according to a desired function such as a second order transfer function 496 or another suitable function to compensate for dynamic delays. Next, the control module 102 may generate one or more signals 498 indicative of the determined RWA to the vehicle control module 104, as explained herein.

Figure 5:
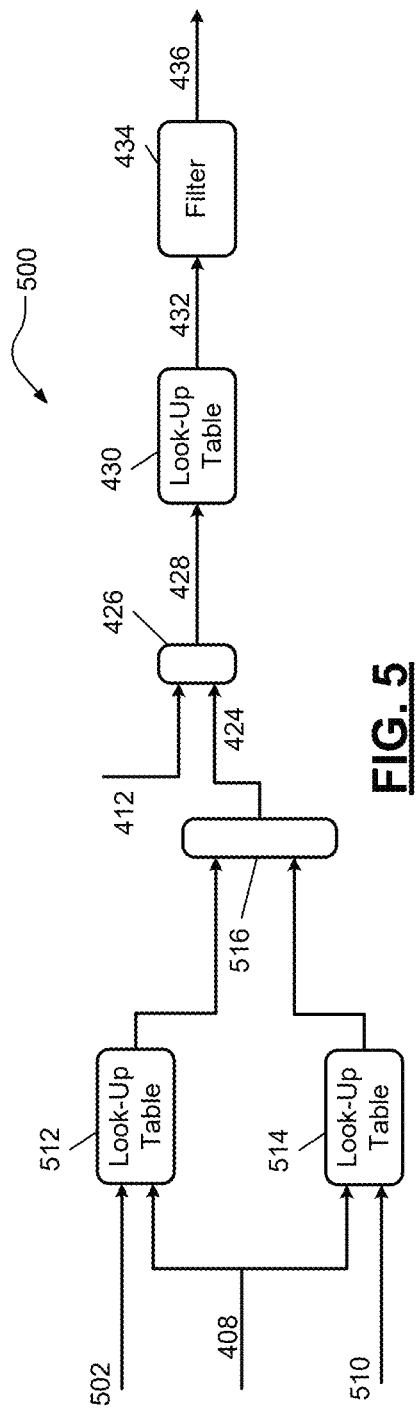

FIG. 5 depicts an example control process 500 for implementing a portion of the control path 404 of FIG. 4. As shown, the control process 500 includes receiving wheel-to-body displacement values 502, 510 for left and right front (or rear) sides of the vehicle, and the steering wheel angle 408 of FIG. 4. The wheel-body displacement values 502, 510 may be provided by separate wheel-to-body sensors 114 if available or determined based on the vertical accelerations of the vehicle (e.g., provided by separate vertical acceleration sensors 108), as explained herein. Then, the control module 102 compares (at box 516) outputs obtained from look-up tables 512, 514 based on the wheel-to-body displacement values 502, 510 and the steering wheel angle 408. The control module 102 then determines the steering arm length 424 based on this comparison. Next, the control module 102 multiples (at the box 426) the steering arm length 424 and the steering rack load 412 to obtain the kingpin torque 428, as explained herein. The control module 102 then obtains the compliance steer angle 432 according to the look-up table 430, and applies the filter 434 to obtain the filtered compliance steer angle 436.

Figure 6:
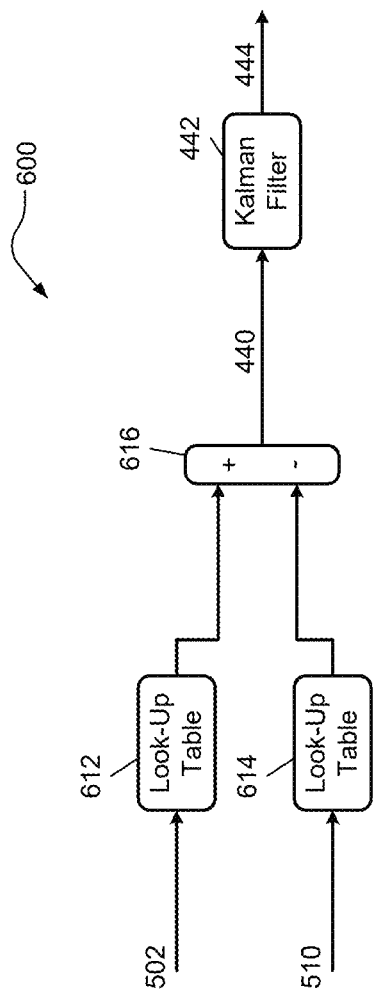

FIG. 6 depicts an example control process 600 for implementing another portion of the control path 404 of FIG. 4. As shown, the control process 600 includes receiving the wheel-to-body displacement values 502, 510 of FIG. 5 for left and right sides of the vehicle. Then, the control module 102 determines the roll steer angle 440 of FIG. 4 by comparing (at box 616) outputs obtained from look-up tables 612, 614 based on the wheel-to-body displacement values 502, 510. Next, the control module 102 applies the filter 442 to the roll steer angle 440 to obtain the filtered roll steer angle 444, as explained herein.

Figure 7:
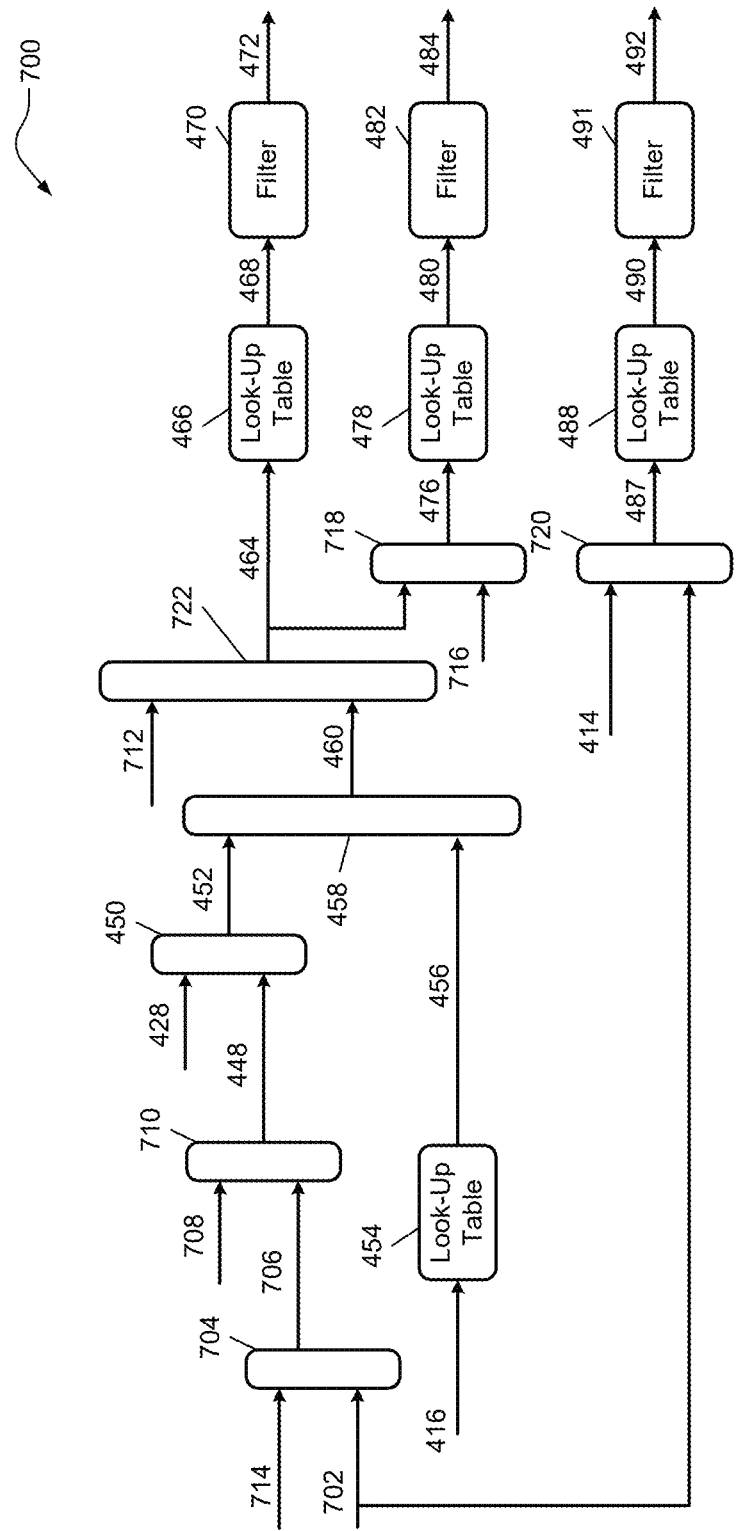

FIG. 7 depicts an example control process 700 for implementing the control path 406 of FIG. 4. As shown, the control process 700 includes receiving wheel torque values 714 for left and right front (or rear) sides of the vehicle, a tire radius 702, and the vehicle speed 416. The control module 102 then determines a tractive force difference 706 based on the wheel torque values 714 and the tire radius 702, and the induced tractive force 448 based on the tractive force difference 706 and a received scrub radius 708. In such examples, the tractive force difference 706 and the induced tractive force 448 may be calculated according to functions 704, 710 (e.g., conventional functions), respectively.

Next, in the example of FIG. 7, the control module 102 determines the aligning torque 460. Specifically, the aligning torque 460 is calculated by multiplying (represented by the box 458) the aligning torque percentage 456 and the output 452 of the box 450. In such examples, the aligning torque percentage 456 is obtained through the look-up table 454 and based on the vehicle speed 416. The output 452 is obtained based on a comparison between the kingpin torque 428 and the induced tractive force 448, as explained herein.

Then, the control module 102 determines the lateral tire force 464 based on the aligning torque 460 and a mechanical and pneumatic trail 712. In such examples, the control module 102 may calculate the lateral tire force 464 at box 722 in any suitable conventional manner based on the aligning torque 460 and the mechanical and pneumatic trail 712. The control module 102 then converts the lateral tire force 464 into the lateral tire angle 468 (via the look-up table 466) and applies the filter(s) 470 to obtain the filtered lateral tire angle 472, as explained herein.

Additionally, the control module 102 determines the tire aligning torque 476 based on the lateral tire force 464 and a pneumatic trail 716. In such examples, the control module 102 may calculate the tire aligning torque 476 at box 718 in any suitable conventional manner based on the lateral tire force 464 and the pneumatic trail 716. The control module 102 then converts the tire aligning torque 476 into the tire aligning angle 480 (via the look-up table 478) and applies the filter(s) 482 to obtain the filtered tire aligning angle 484, as explained herein.

Further, the control module 102 determines the tractive force 487 based on the wheel torque 414 (or wheel torques values 714) and the tire radius 702. In such examples, the control module 102 may calculate the tractive force 487 at box 720 in any suitable conventional manner based on the wheel torque and the tire radius 702. The control module 102 then converts the tractive force 487 into the tractive angle 490 (via the look-up table 488) and applies the filter(s) 491 to obtain the filtered tractive angle 492, as explained herein.

Figure 8:
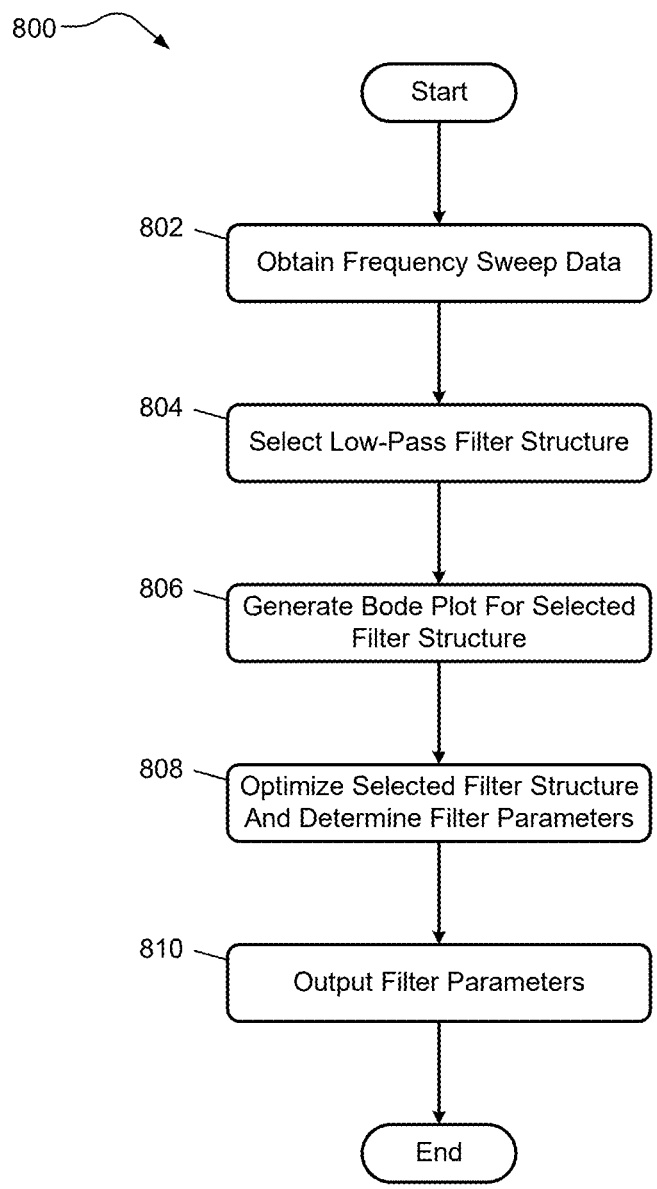
FIG. 8 is a flowchart of an example process for designing a filter for the vehicle system of FIG. 1, according to the present disclosure.

FIG. 8 illustrates an example process 800 for designing a filter for the vehicle system of FIG. 1. As shown in FIG. 8, the process 800 begins at 802 where frequency sweep data from one or more vehicle tests or simulations is obtained. As explained above, the frequency sweep data may include, for example, a steering wheel angle (e.g., 30 degrees, etc.), a frequency sweep range (e.g., 0-5 Hz sweep), a recorded filtered roll steer angle, a compliance steer angle, a front (or rear) RWA, etc. The process 800 then proceeds to 804.

At 804, a low-pass filter structure is selected. In such examples, the filter structure may be any suitable low-pass filter structure, such as a first order filter structure, a second order filter structure, etc. The process 800 then proceeds to 806.

At 806, a Bode plot is obtained using one or more inputs (e.g., the compliance steer angle) and outputs (e.g., the front or rear RWA, the filtered roll steer angle, the kinematic, estimated RWA, etc.). In various embodiments, the Bode plot may be generated by using a function, such as MAT-LAB tfestimate, etc. as explained above. The process 800 then proceeds to 808.

At 808, the selected low-pass filter structure is optimized, and filter parameters are determined. In various embodiments, the low-pass filter structure may be optimized, and the filter parameters may be determined according to equation (1) above. The process 800 then proceeds to 810, where the filter parameters are output for use with the selected low-pass filter structure. The process then ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for determining a road wheel angle of a vehicle, the vehicle system comprising:
   a plurality of sensors configured to detect a plurality of vehicle parameters including at least a steering rack load on a steering rack of the vehicle; and
   a control module in communication with the plurality of sensors, the control module configured to:
     calculate a kingpin torque based on the sensed steering rack load and a wheel-to-body displacement of the vehicle;
     determine a roll steer angle based on the wheel-to-body displacement of the vehicle;
     determine a road wheel angle of the vehicle based on the roll steer angle and the kingpin torque; and
     generate a signal indicative of the road wheel angle to control at least one vehicle control system.

2. The vehicle system of claim 1, wherein:
   the plurality of sensors includes at least one wheel-to-body sensor configured to detect the wheel-to-body displacement of the vehicle; and
   the control module is configured to receive the wheel-to-body displacement of the vehicle from the at least one wheel-to-body sensor.

3. The vehicle system of claim 1, wherein:
   the plurality of sensors includes at least one vertical acceleration sensor configured to detect a vertical acceleration of the vehicle; and
   the control module is configured to receive the vertical acceleration of the vehicle and determine the wheel-to-body displacement of the vehicle based on the vertical acceleration of the vehicle.

4. The vehicle system of claim 3, wherein:
   the plurality of sensors includes a body-based acceleration sensor configured to detect a longitudinal acceleration of the vehicle; and
   the control module is configured to receive the longitudinal acceleration of the vehicle and determine the wheel-to-body displacement of the vehicle based on the vertical acceleration of the vehicle and the longitudinal acceleration of the vehicle.

5. The vehicle system of claim 1, wherein:
   the plurality of vehicle parameters includes a steering wheel angle; and
   the control module is configured to determine a steering arm length of the vehicle based on the steering wheel angle and the wheel-to-body displacement of the vehicle, and calculate the kingpin torque based on the sensed steering rack load and the steering arm length.

6. The vehicle system of claim 1, wherein:
   the plurality of vehicle parameters includes a steering wheel angle; and
   the control module is configured to determine an estimated road wheel angle based on the steering wheel angle, and determine the road wheel angle of the vehicle based on the roll steer angle, the kingpin torque, and the estimated road wheel angle.

7. The vehicle system of claim 1, wherein the control module is configured to:
   convert the kingpin torque into a compliance steer angle;
   apply a low-pass filter to the compliance steer angle to generate a filtered compliance steer angle; and
   determine the road wheel angle of the vehicle based on the filtered compliance steer angle and the roll steer angle.

8. The vehicle system of claim 7, wherein the control module is configured to:

determine wheel-to-body displacement values for a left side and a right side of the vehicle;

convert the wheel-to-body displacement values into the roll steer angle;

apply a filter to the roll steer angle to generate a filtered roll steer angle; and determine the road wheel angle of the vehicle based on the filtered roll steer angle and the filtered compliance steer angle.

9. The vehicle system of claim 8, wherein the filter is a Kalman filter.

10. The vehicle system of claim 1, wherein the control module is configured to:

determine an aligning torque of the vehicle based on the kingpin torque and a wheel torque; and determine the road wheel angle of the vehicle based on the roll steer angle, the kingpin torque, and the aligning torque.

11. The vehicle system of claim 10, wherein:

the plurality of sensors includes a vehicle speed sensor configured to detect a speed of the vehicle; and the control module is configured to receive the speed of the vehicle and determine the aligning torque of the vehicle based on the kingpin torque, the wheel torque, and the speed of the vehicle.

12. The vehicle system of claim 1, further comprising a vehicle control module in communication with the control module, the vehicle control module configured to:

receive the road wheel angle signal from the control module; and control the at least one vehicle control system based on the road wheel angle signal.

13. A vehicle including the vehicle system of claim 12 configured to determine the road wheel angle of the vehicle.

14. A method for determining a road wheel angle of a vehicle, the method comprising:

determining a kingpin torque based on a steering rack load and a wheel-to-body displacement of the vehicle;

determining a roll steer angle based on the wheel-to-body displacement of the vehicle;

determining a road wheel angle of the vehicle based on the roll steer angle and the kingpin torque; and generating a signal indicative of the road wheel angle to control at least one vehicle control system.

15. The method of claim 14, further comprising determining the wheel-to-body displacement of the vehicle, wherein determining the wheel-to-body displacement of the vehicle includes:

sensing, via at least one wheel-to-body sensor, the wheel-to-body displacement of the vehicle; or sensing, via at least one vertical acceleration sensor, a vertical acceleration of the vehicle, and determining the wheel-to-body displacement of the vehicle based on the vertical acceleration of the vehicle.

16. The method of claim 15, wherein:

the method further includes sensing, via a body-based acceleration sensor, a longitudinal acceleration of the vehicle; and determining the wheel-to-body displacement of the vehicle includes determining the wheel-to-body displacement based on the vertical acceleration of the vehicle and the longitudinal acceleration of the vehicle.

17. The method of claim 14, wherein:

the method further includes determining a steering arm length of the vehicle based on a steering wheel angle and the wheel-to-body displacement of the vehicle; and calculating the kingpin torque includes calculating the kingpin torque based on the steering rack load and the steering arm length.

18. The method of claim 14, wherein:

the method further includes determining an estimated road wheel angle based on a steering wheel angle; and determining the road wheel angle of the vehicle includes determining the road wheel angle of the vehicle based on the roll steer angle, the kingpin torque, and the estimated road wheel angle.

19. The method of claim 14, wherein:

the method further includes sensing, via a vehicle speed sensor, a speed of the vehicle, and determining an aligning torque of the vehicle based on the kingpin torque, a wheel torque, and the speed of the vehicle; and determining the road wheel angle includes determining the road wheel angle of the vehicle based on the roll steer angle, the kingpin torque, and the aligning torque.

20. The method of claim 14, further comprising controlling the at least one vehicle control system based on the generated road wheel angle signal.

* * * * *